Aug. 29, 1950   J. E. WERNER ET AL   2,520,867
FREQUENCY METER
Filed Feb. 21, 1948   2 Sheets—Sheet 1
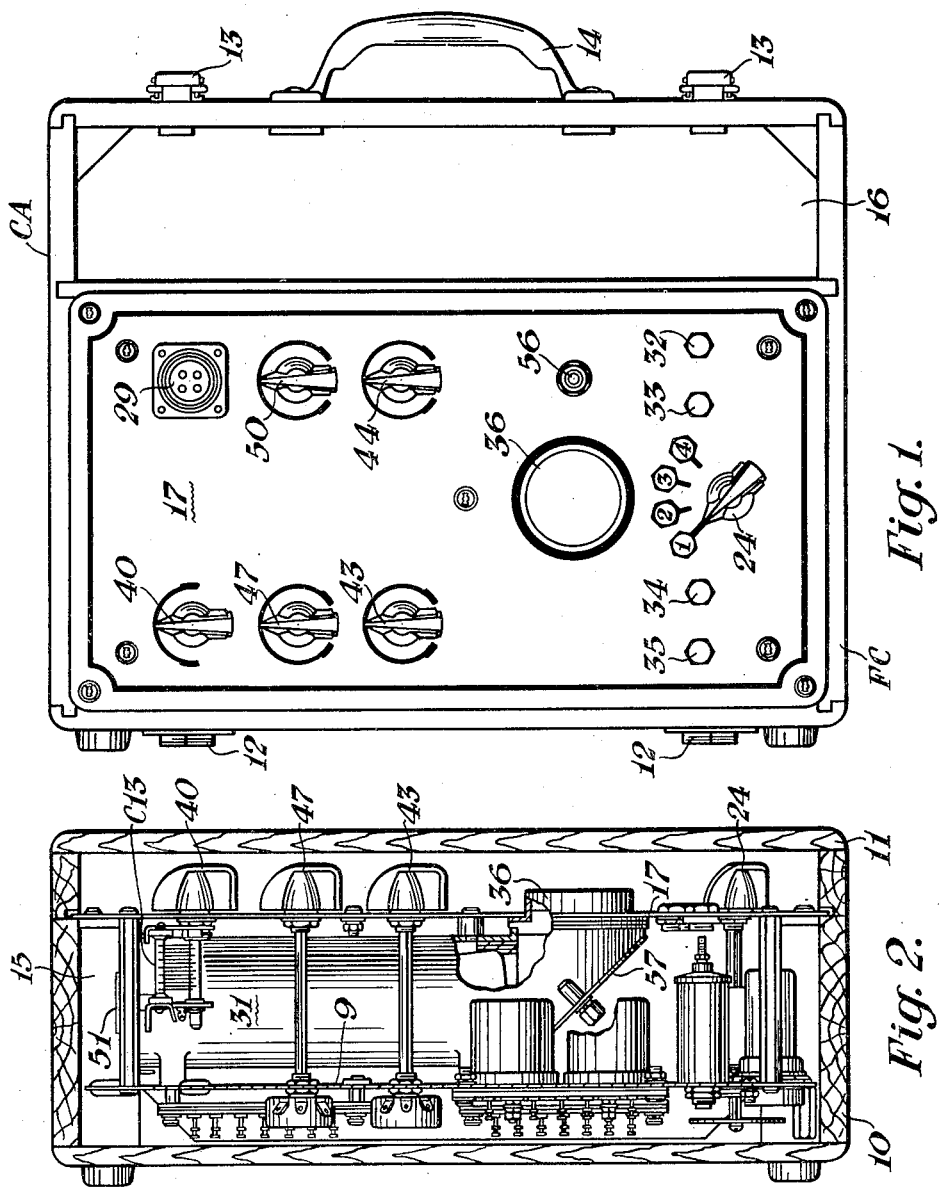
INVENTORS.
John E. Werner, Harold D. Bechtol
and Edgar W. Breisch
BY
THEIR ATTORNEY Aug. 29, 1950  J. E. WERNER ET AL  2,520,867
FREQUENCY METER
Filed Feb. 21, 1948  2 Sheets—Sheet 2
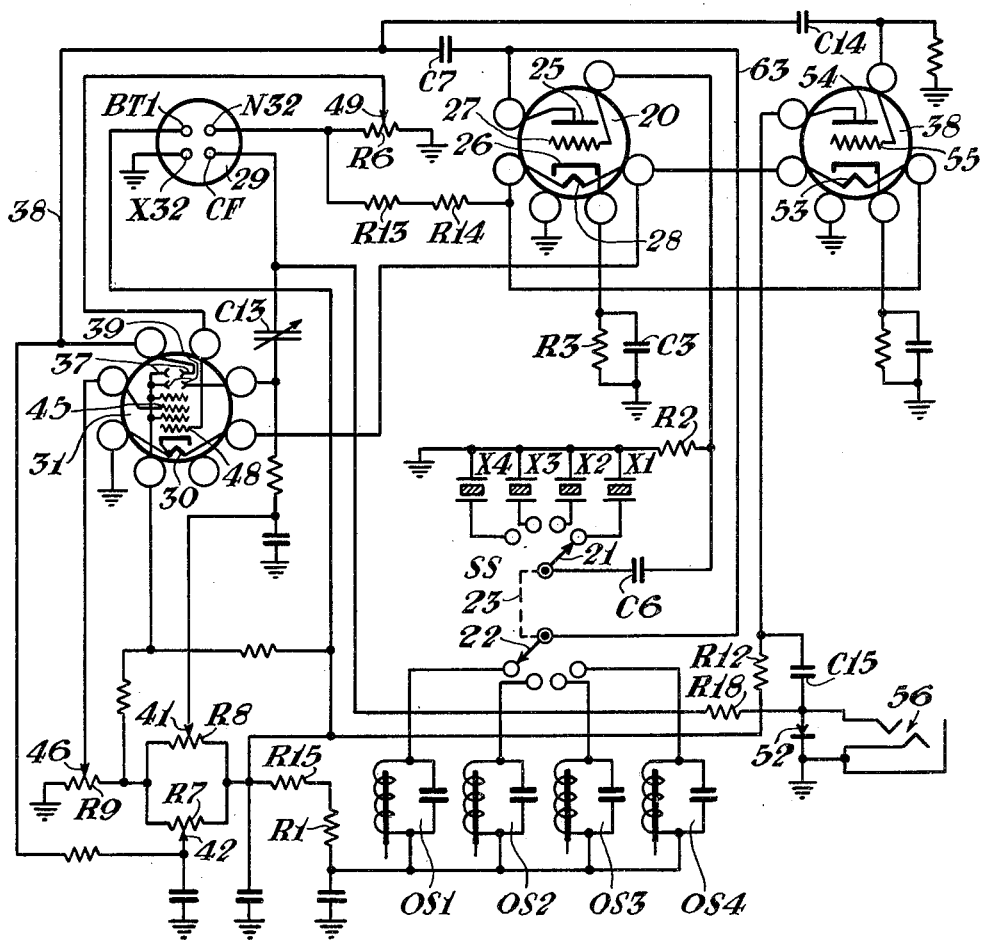
Fig. 3.
INVENTORS.
John E. Werner, Harold D. Bechtol
and Edgar W. Breisch
BY
THEIR ATTORNEY Patented Aug. 29, 1950

2,520,867

UNITED STATES PATENT OFFICE 2,520,867

FREQUENCY METER

John E. Werner, Glenshaw, and Harold D. Bechtol and Edgar W. Breisch, Edgewood, Pa., assignors to The Union Switch and Signal Company, Swissvale, Pa., a corporation of Pennsylvania Application February 21, 1948, Serial No. 10,016

4 Claims. (Cl. 250—39)

Our invention relates to meters for testing transmitters of communication systems, and more particularly to meters for checking the frequency of transmitters.

Many communication systems use frequency modulation and the maintenance of exact transmitter frequency is essential. In FM mobile communication systems, such as, for example, railway train telephone systems, loss of signal strength with a corresponding decrease in the range of communication, as well as an increased tendency to produce an undesirable amplitude modulation, may result from a comparatively slight drift of the transmitter oscillator frequency. At the receiving station, improper maintenance of the transmitter frequency will appear as distortion in the reproduction of the speech. Inaccuracy in the oscillator frequency, if extreme, may cause overloading in the power amplifier tubes ordinarily provided with transmitters of the type here involved, with a subsequent shortening of the life of the tubes. In multiple channel systems using a single transmitter capable of being differently conditioned to supply the different channel frequencies it is impossible to maintain proper balance between the different channel load currents on the power amplifier of the transmitter if the center frequency of the different channels is not kept as close as possible to their respective values.

These conditions arising in FM communication systems make it essential that the frequency of the transmitters of such systems be checked periodically and in fact almost a daily check is desirable.

In railway train communication systems, the inspecting and testing of the train carried equipment is done at engine houses or terminal points while the locomotive or other vehicle on which the equipment is mounted, is being made ready for a trip. That is to say, the testing and inspecting of such train carried equipment are done while other servicing of the vehicle is going on and are often done under adverse conditions. Thus, any testing instrument used for such testing should be of the portable type and should be rugged and capable of being used quickly. Again, when the meter is of a kind that requires a source of power for its operation, it must be provided with a self contained source or arranged to use an available source of power and preferably without the necessity of a voltage converting device.

Furthermore, a railway may have one train communication system for main line trains and other systems for use at yards and terminals, the different systems using different channel frequencies. It is desirable therefore if the testing of the transmitters of these several different systems of a railway can be done by a single meter.

Accordingly, a feature of our invention is the provision of a novel and improved meter for testing transmitters of communication systems.

Another feature of our invention is the provision of a novel and useful frequency checking meter which is portable, rugged, and embodies the characteristics of a precision instrument.

Again, a feature of our invention is the provision of an improved frequency checking meter which is capable of using the power source of the transmitter being tested and without the use of special voltage converting devices.

Another feature of our invention is the provision of a frequency checking meter capable of being used for testing the transmitters of several different channel frequencies.

Other features, objects and advantages of our invention will appear as the specification progresses.

To attain the foregoing features, objects and advantages of our invention, we provide a meter having an oscillation means, a visual frequency comparison means, and an audible frequency comparison means. These different elements are arranged as a complete assembly or unit adaptable of being housed in a relatively small portable case. This case is provided with a top panel on which there are grouped the adjusting control levers and the indicating elements of the meter, the arrangement being such that the levers and indicators are readily accessible for operation and the indicators easy to observe. Also, the necessary input and power terminals of the meter are grouped in a single receptacle of the plug-in type and which receptacle is mounted on the panel so that the meter can be quickly and easily connected to the transmitter to be tested, such connections being effected by a single cable provided at one end with a plug type connector to fit the receptacle and at the other end with clips or plugs for connection to the different terminals of the transmitter. The meter is provided with a head receiver for use with the audible frequency comparison means, this head receiver being fitted with a cable of convenient length and which cable is formed at one end with a plug contact for insertion into a jack located on the meter panel. The case of the meter is preferably provided with a compartment in which the power and input cable as well as the head receiver and its cable can be stored when the meter is not in use.

We shall describe one form of meter embodying our invention and shall then point out the novel features thereof in claims.

In the accompanying drawings, Fig. 1 is a top plan view with the cover removed showing a preferred form of meter embodying our invention when used with a railway train communication system. Fig. 2 is a side sectional view of the meter of Fig. 1. Fig. 3 is a diagrammatic view showing the apparatus and circuits of the meter of Figs. 1 and 2.

It is to be understood that our meter is not limited in its use to railway train communication systems and this one application illustrates the many places the meter is useful.

In each of the different views like reference characters are used to designate similar parts.

Referring to Figs. 1 and 2, a meter designated as a whole by the reference character FC is provided with a case CA of suitable material and which case comprises a lower box portion 10 and a cover 11. The cover 11 is secured to the box portion 10 by hinges 12 and latches 13, the hinges 12 being preferably of the slip joint type to permit the cover to be readily removed for more convenient use of the meter. A handle 14 is secured to the case CA to facilitate the carrying of the meter.

The box portion 10 of the case CA is formed with a large compartment 15 in which the apparatus and circuits to be referred to hereinafter are housed, and with a small compartment 16 in which the connection cable and the head receiver provided for the meter can be stored when the meter is not in use.

In practicing the invention we have found that a wooden case of approximately 15 inches long, 14 inches wide and 7 inches high, forms a suitable housing for the meter embodying our invention.

A top panel 17 of suitable material is fitted over the compartment 15 of the case and this top panel has mounted thereon the several manually operable control levers of the meter, a visual indicating screen, a jack for the head receiver and a receptacle for terminal connections, and all of which elements will be referred to from time to time as the specification progresses. As best shown in Fig. 2, a subpanel 9 is supported beneath the panel 17 in the compartment 15 as by long screws or other fasteners and the two panels 17 and 9 form a frame on which the different elements of the meter are mounted in a compact assembly or unit, and which assembly is secured in place in the compartment 15 as by screws shown in the extreme corners of the panel 17 in Fig. 1.

Referring to Fig. 3, an oscillation means of the meter includes an electron tube 20, a group of four crystals X1, X2, X3, and X4, a corresponding group of four oscillatory circuits OS1, OS2, OS3, and OS4, and a selector switch SS together with suitable circuit connections.

The selector switch SS comprises contact members 21 and 22 operatively connected together as indicated by a dotted line 23, and further operatively connected by a shaftlike member, not shown, to a manually operable control lever 24 mounted on the top of the meter panel 17. The control lever 24 is operable to four different positions which are designated by numerals 1, 2, 3, and 4 as will be readily understood by an inspection of Fig. 1. Thus the two contact members 21 and 22 of the selector switch are moved in a step-by-step manner by the operation of the control lever 24, the contact members 21 and 22 each having four distinctive contact positions. The contact member 21 selects by its different positions the crystal and the contact member 22 selects by its different positions, the oscillatory circuit to be connected to the tube 20. The crystals X1 to X4 may be of any one of several forms of crystals and each is ground to be resonant at a given individual frequency. Each of the oscillatory circuits comprises an inductive coil and a capacitor and each of these circuits is tuned to resonance at the carrier frequency of a selected one of the crystals. The oscillatory circuits are tuned through adjustable cores of the coils of the circuits, each core being operatively connected by means not shown to a metal cap mounted on the top of the meter panel 17, the four metal caps being indicated by the numerals 32, 33, 34, and 35, and disposed as shown in Fig. 1 to the right and to the left of the selector switch lever 24.

As an aid in the understanding of the meter, we shall assume by way of illustration that the crystal X1 and its corresponding circuit OS1 are resonant at a carrier frequency of 198 kc., crystal X2 and its corresponding circuit OS2 are resonant at a carrier frequency of 144 kc., crystal X3 and its circuit OS3 are resonant at 103 kc., and crystal X4 and its circuit OS4 are resonant at 80 kc. It is to be understood that other carrier frequencies can be used.

These crystals and oscillatory circuits are connected to the tube 20 according to the setting of the selector switch SS so that a definite frequency for the oscillations created by the tube is provided for each position of the selector switch. The tube 20 is preferably an indirectly heated triode having an anode 25, a cathode 26, a control grid 27 and a heater element 28. The heater 28 is provided with a circuit connection extending from a terminal N32 of a receptacle 29 to be referred to hereinafter, through resistors R13 and R14, heater 28 of tube 20, a heater 30 of another tube 31 to be described shortly, and ground to a ground terminal X32 of the receptacle 29. The parts of this circuit are so proportioned that the tube 20 is properly heated when a direct current voltage source of a relatively low voltage of say 32 volts is connected across the two terminals N32 and X32 of the receptacle 29, such current source being at times connected to these terminals in a manner to be explained hereinafter. The anode 25 of the tube 20 is powered by a circuit including a terminal BT1 of the receptacle 29, resistors R15 and R1, a particular one of the oscillatory circuits according to the position of the selector switch SS, contact member 22, wire 63, anode 25 and tube space to cathode 26, resistor R3 and capacitor C3 in multiple, ground and terminal X32. The parts of this circuit are so proportioned that the tube 20 is satisfactorily powered when a direct current source of relatively high voltage of say 350 volts, is applied between terminals BT1 and X32 of the receptacle. The control grid 27 of tube 20 is connected to ground through two parallel paths, one of which includes a capacitor C6 and a particular one of the crystals according to the position of the contact member 21 of the selector switch, and the other of which paths includes a resistor R2. It is apparent from the foregoing description of the circuits described for the tube 20 that oscillations corresponding to the resonant frequency of the particular crystal and oscillatory circuit connected to the tube are produced when power is applied to the terminals BT1, X32, and N32 of the receptacle 29. We have found that the crystal controlled oscillator of the type here provided can be readily made to have a frequency drift tolerance of .02 per cent from 0° to 50° centrigrade and it will be of a high order of stability under all conditions of operation.

The visual frequency comparison means of the meter includes a cathode ray oscilloscope and a control circuit network to supply the necessary voltages to the cathode ray tube. The cathode ray tube 31 of the oscilloscope is of a suitable form and is held in a socket carried on a mounting bracket 51 secured to subpanel 9 of the meter. The tube is positioned for its image to be focused by a mirror 57 on a screen 36 mounted in the top panel 17 of the meter. The tube 31 is provided with special attachments, not shown, that cooperate with mating devices carried on the panels 9 and 17 so that the tube is held firmly in place and is cushioned to withstand vibrations and shocks notwithstanding the meter may be subjected to rough handling. The heater element 30 of tube 31 in series with the heater element 28 of tube 20 is connected across the terminals X32 and N32 of the receptacle as previously traced and the tube 31 is heated whenever the proper voltage is applied to the receptacle terminals.

Horizontal deflection plates 37 of tube 31 are coupled to the output of the oscillator tube 20 through a capacitor C7, and vertical deflection plates 39 of the tube 31 are connected to an input terminal CF of the receptacle 29 through an attenuator consisting of a capacitor C13, capacitor C13 being adjustable and operatively connected to a control lever 40 mounted on the panel 17 of the meter. Accordingly, an image will be presented on the screen 36 whenever carrier frequency waves are applied to the two plates 37 and 39 and the strength of the wave supplied from terminal CF to the deflection plate 39 can be manually controlled by the setting of the lever 40.

For positioning the image on the screen the horizontal and vertical deflection plates 37 and 39 are provided with control voltages derived from a voltage divider network comprising resistors R7, R8, and R9, the resistors R7 and R8 in multiple being connected in series with resistor R9 across the high voltage terminals BT1 and X32 of the receptacle 29. The voltage applied to the vertical deflection plate 39 is derived from an adjustable terminal 41 of resistor R8 and the voltage applied to the horizontal deflection plate 37 is derived from an adjustable terminal 42 of resistor R7. The terminals 41 and 42 are operatively connected to control levers 43 and 44, respectively, mounted on the top of the panel 17 whereby the figure presented on the screen 36 can be moved to a center position or to a position for best presentation by adjusting the levers 43 and 44.

An anode 45 of the tube 31 is provided with a voltage from an adjustable terminal 46 of the resistor R9 of the voltage divider network, and which terminal 46 is operatively connected to a control lever 47 mounted on the panel 17 with the result the outline of the figure presented on the screen can be sharpened by adjusting the lever 47. Again, a control electrode 48 of the tube 31 is provided with a bias voltage from a voltage divider comprising resistor R6 connected between terminals N32 and X32 of the receptacle 29, an adjustable terminal 49 of resistor 46 being connected to the control grid 48 and the terminal 49 being operatively connected to a control lever 50 mounted on the panel 17. Consequently the intensity of the image presented on the screen 36 can be governed by adjusting the control lever 50.

The manner of operation of this visual frequency comparison means will be explained more fully when the operation of the meter is described.

The audible frequency comparison means of the meter includes an amplifier tube 38 and a mixer rectifier 52. The tube 38 is preferably an indirectly heated triode similar to tube 20, and the heater element 53 of tube 38 is connected in multiple with the heater element 28 of tube 20 as will be readily understood by an inspection of Fig. 3. Thus, the tube 38 is heated whenever proper voltage is applied to the terminals X32 and N32 of the receptacle 29. An anode 54 of tube 38 is powered from terminal BT1 of the receptacle through a resistor R12 and a control grid 55 of the tube 38 is coupled to the oscillator tube 20 through capacitors C14 and C7.

The mixer rectifier 52 is preferably of the crystal mixer rectifier type but other forms may be used. The input side of the mixer rectifier 52 is coupled to the input terminal CF of the receptacle 29 through a resistor R18 and is coupled to the anode circuit of the amplifier 38 through a capacitor C15. The output of the mixer rectifier element 52 is connected to ground and across the rectifier 52 are connected the terminals of a jack 56 mounted in the panel 17, the jack 56 being adapted to receive the plug of the cord of the head receiver provided for the meter as explained hereinbefore.

It follows from the foregoing description that the frequency of the oscillator tube 20 and the frequency of energy applied to terminal CF are mixed at the rectifier 52 and a wave having a frequency corresponding to the beat frequency of the two frequencies is applied across the terminals of the jack 56 and a corresponding note will be sounded in the head receiver.

The receptacle 29 provided on the panel 17 of the meter is of the plug-in type adapted to receive the plug connection of a four conductor cable provided for the meter as explained hereinbefore. One end of this cable is provided with plugs which fit into the receptacle 29 only in one position so that a designated conductor of the cable is connected with a designated terminal of the receptacle. The other ends of three of the conductors of the cable are provided with clips while the fourth conductor is provided with a special type of plug to mate with a cooperating jack. The clips of the cable will be clearly identified to aid the operator in making the proper power connections when using the meter. This cable as well as the head receiver and its cable can be stored in the compartment 16, as explained hereinbefore, when the meter is not in use.

It is to be pointed out that the transmitters to be tested are provided each with a power source or power unit, and which power unit is capable of supplying a relatively low voltage and a relatively high voltage, the low voltage source being usually of the order of 32 volts and the high voltage source being usually of the order of 350 volts. It is to be understood, however, that power sources of other voltages can be used. In such power sources the positive terminal of the low voltage source and the negative terminal of the high voltage source are connected to a common ground terminal which is here identified as terminal X32. The positive terminal of the high voltage source is identified as BT1 and the negative terminal of the low voltage source is identified as N32.

In testing the transmitter, the meter FC is placed alongside the equipment box in which the transmitter and its power unit and usually the receiver of the communication system are housed. The BT1, X32, and N32 conductors of the meter cable are clipped onto the corresponding terminals of the equipment box and the plug end of the cable is inserted into the receptacle 29 of the meter. Also, the plug terminal of the fourth conductor of the cable is inserted into a jack usually provided for the transmitter and which jack is connected to the carrier oscillator tube of the transmitter so that the carrier frequency of the transmitter is applied to the input terminal CF of the meter. With the cable thus connected the meter is powered ready for operation. The transmitter to be tested is then set into operation so that its carrier frequency is applied to terminal CF of the meter. If the transmitter is of the two channel type capable of supplying different channel frequencies, a particular one is selected, that is, the transmitter is conditioned to supply a given one of its carriers. The selector switch SS of the meter is set for its oscillator to supply the corresponding carrier frequency at which the transmitter is conditioned. With the wave from the meter oscillator and the wave from the transmitter under test applied to the cathode ray tube, a resultant figure is presented on the screen 36. The attenuator lever 40 of the meter is adjusted to obtain an approximately square figure on the screen 36. If necessary focus and intensity of the presentation on the screen are adjusted by the control levers 47 and 50 so as to give a clear presentation of sufficient brilliance. Also, if the presentation is not centered properly on the screen the control levers 43 and 44 are adjusted.

With the head receiver adjusted to the operator, its cord is plugged into the jack 56 of the meter. If there is a difference of the order of 30 cycles per second or more in the frequency of the oscillator of the meter and the oscillator of the transmitter an audible note that has a pitch corresponding to the difference between the two frequencies will be heard in the head receiver.

Assuming a note is heard in the head receiver indicating that the transmitter is out of adjustment, the adjustment means provided for the transmitter is unlocked and adjusted in the usual manner while the operator is listening to the note in the head receiver, and also at the same time observing the presentation on the screen 36. In case the note heard in the head receiver increases in pitch the direction of movement of the transmitter adjustment should be reversed. If the note decreases in pitch the operator continues the adjustment until the note is no longer heard, indicating that the difference between the crystal oscillator frequency and the transmitter frequency is less than an audible frequency. After the audible note in the head receiver is no longer heard, the adjustment is continued by observing the presentation on the screen. When the voltage applied to the two sets of deflection plates 37 and 39, one from the crystal oscillator of the meter and one from the transmitter oscillator are of the same frequency a circle will appear on the screen 36. As the difference between the transmitter oscillator frequency and the meter crystal oscillator frequency is reduced, the presentation on the screen 36 will first shift from a circle to a straight line inclined about 45° to the horizontal and back to the circle again. The rate of this shift will decrease as the two frequencies are brought closer together until all motion stops, indicating that the transmitter oscillator has practically the same frequency as the crystal oscillator of the meter. At this point the operator locks the transmitter adjustment in place, the frequency of the transmitter being again checked to assure that the transmitter frequency has not been changed in the locking of the adjustment means. In most cases it would not be possible to maintain the circle absolutely motionless but approximate complete synchronism of the transmitter oscillations and the oscillations of the crystal oscillator of the meter can be obtained.

If the original difference in the frequency is large, say 200 cycles per second or more, the figure on the screen will appear to the eye to be the same regardless of the direction the operator adjusts the transmitter. This is because the human eye is unable to follow the circle and its changes at a rate of much more than 25 to 30 times per second. However, the pitch of the note heard in the head receiver is easy to observe and the operator can tell quickly if the difference between the oscillations is being increased or decreased by the adjustment. Thus by the use of the audible frequency comparison means and then the visual frequency comparison means of the meter the transmitter under test can readily and quickly be brought to its specific carrier frequency.

To check the other carrier frequency of the transmitter the procedure is substantially the same, the transmitter being conditioned to supply this other carrier frequency and the selector switch SS on the meter being set for the corresponding carrier frequency.

It is apparent that by the several adjustments of the meter, proper intensity, focus and position of the presentation on the screen can be quickly obtained for each of the different carrier frequencies being tested.

The meter here disclosed provides four crystal oscillators for testing four different transmitter frequencies, but it is apparent that if additional transmitter frequencies are used the meter can be equipped with additional crystal controlled circuits and the selector switch provided with additional positions.

A meter of the type here disclosed has the advantages that it is portable and can easily be used at any location and testing can be carried on under adverse circumstances. A transmitter can be checked as to its frequency quickly and with a high degree of accuracy. Also the meter requires no self-contained source of power since it is powered from the power sources usually provided with the transmitter to be tested. Again, a relatively large number of transmitters of different frequencies can be tested by the meter.

Although we have herein shown and described but one form of meter for testing transmitters of communication systems embodying our invention, it is understood that various changes and modifications may be made therein within the scope of the appended claims without departing from the spirit and scope of our invention.

Having thus described our invention, what we claim is:

1. In a meter for testing transmitters of a communication system using a given carrier frequency and each of which transmitters includes an oscillator supplying said carrier frequency and is provided with a high and a low voltage power source, the combination comprising, a standard oscillator proportioned to create oscillations of a selected carrier frequency, a visual frequency comparison means including a cathode ray tube and a screen, an audible frequency comparison means including a mixer rectifier and a head receiver, a receptacle having an input terminal and high and low voltage power terminals, said input terminal adapted to receive a carrier frequency current, said high and low voltage terminals arranged for connection to a high and a low voltage power source respectively, circuit means including manually operable control devices to connect said cathode ray tube to said standard oscillator, said input terminal and said high and low voltage terminals; said control devices operable to condition said cathode ray tube for the figure presented on said screen to be characterized according to the difference in the frequency received at said input terminal and the frequency of said standard oscillator, and other circuit means to connect said mixer rectifier to said input terminal and said standard oscillator to create in said head receiver a note the pitch of which is determined by the difference between the carrier frequency received at said input terminal and the frequency of said standard oscillator.

2. In a meter for testing transmitters of a communication system using a given carrier frequency and each of which transmitters includes an oscillator supplying said carrier frequency and is provided with a high and a low voltage power source, the combination comprising, a crystal controlled electron tube oscillator tuned to create oscillations of a given carrier frequency; a visual frequency comparison means including a cathode ray tube, a screen and a control circuit network; an audible frequency comparison means including an amplifier tube and a mixer rectifier adaptable of having a head receiver connected thereto, said meter having an input terminal and high and low voltage power terminals adapted to receive a carrier frequency current and a high and a low voltage power current respectively, means to connect said crystal controlled oscillator to said high and low voltage power terminals for effective energization of that oscillator, said circuit network connecting said cathode ray tube to said crystal controlled oscillator and to said input and high and low voltage terminals and having manually operable control devices interposed therein to condition the cathode ray tube for a given presentation on said screen when the carrier frequency received at said input terminal is equal to the frequency of said crystal controlled oscillator, and other circuit means to connect said amplifier tube and said mixer rectifier to said crystal controlled oscillator and to said input and high and low voltage terminals to create in said head receiver a note the pitch of which is determined by the difference between the carrier frequency received at said input terminal and the frequency of said crystal controlled oscillator.

3. In a meter for testing transmitters of a communication system using a given carrier frequency and each of which transmitters includes an oscillator supplying said carrier frequency and is provided with a high and a low voltage power source, the combination comprising; a receptacle having an input, a high and a low voltage terminal adapted to receive a carrier frequency current and a high and a low voltage power current respectively; a crystal controlled electron tube oscillator tuned to create oscillations of a selected carrier frequency and having connections to said high and low voltage terminals for energization of that oscillator, a cathode ray tube having a screen, a control circuit network including manually operable control devices to connect said cathode ray tube to said input, high and low voltage terminals and to said crystal controlled oscillator to provide on said screen a given visual presentation when the frequency of said carrier received at said input terminal is substantially equal to the frequency of said crystal controlled oscillator, an amplifier tube, a mixer rectifier, means to connect said amplifier tube to said high and low voltage terminals and to said crystal controlled oscillator, means to couple said rectifier to said input terminal and to said amplifier tube, and a jack having connections to said rectifier and adapted to receive a cord plug of a head receiver to provide a note the pitch of which is an audible indication of the difference in the frequency of said carrier received at said input terminal and the frequency of said crystal controlled oscillator.

4. In a meter for testing the transmitters of communication systems using frequency modulation with each system using a center carrier frequency individual to the system, the combination comprising, an oscillator electron tube, a plurality of crystals each resonant at a selected individual carrier frequency, a plurality of oscillatory circuits one for each said crystal and each circuit tuned to resonance at the carrier frequency of the respective crystal, a selector switch having a plurality of positions one for each of said crystals and the respective oscillatory circuit, a pair of power terminals adapted to be supplied with power, a first circuit means controlled by said selector switch to connect said power terminals, crystals and oscillatory circuits to said oscillator tube in such a manner as to generate oscillations of a carrier frequency selected by the position of said switch, an input terminal adapted to receive a carrier frequency current; an audible frequency comparison means including an amplifier tube, a mixer rectifier and a head phone jack having connections to the rectifier; a second circuit means to connect said power and input terminals and the oscillator tube to said amplifier tube and said rectifier in such a manner as to supply to said jack a beat frequency equal to the difference between the carrier frequency received at said input terminal and the carrier frequency supplied by said oscillator tube; a visual frequency comparison means including a cathode ray tube having a vertical and a horizontal deflecting plate, an anode, a cathode, a control grid and a screen; means to connect one of said deflecting plates to said oscillator anode and the other to said input terminal, an adjustable capacitor being included in the connection to the input terminal, and a third circuit means including a resistor network having adjustable terminals to connect said power terminals to said anode, cathode, control grid and deflecting plates of said cathode ray tube in such a manner as to create a desired figure on said screen when the carrier frequency of said oscillator tube is equal to the frequency received at said input terminal.

JOHN E. WERNER.
HAROLD D. BECHTOL.
EDGAR W. BREISCH.

REFERENCES CITED

The following references are of record in the file of this patent:

UNITED STATES PATENTS

| Number | Name | Date |
|---|---|---|
| 2,017,712 | Downey | Oct. 15, 1935 |
| 2,309,481 | Summerhayes, Jr. | Jan. 26, 1943 |
| 2,393,717 | Speaker | Jan. 29, 1946 |
| 2,394,573 | Walsh et al. | Feb. 12, 1946 |
| 2,426,721 | Adams | Sept. 2, 1947 |